Figure 1:
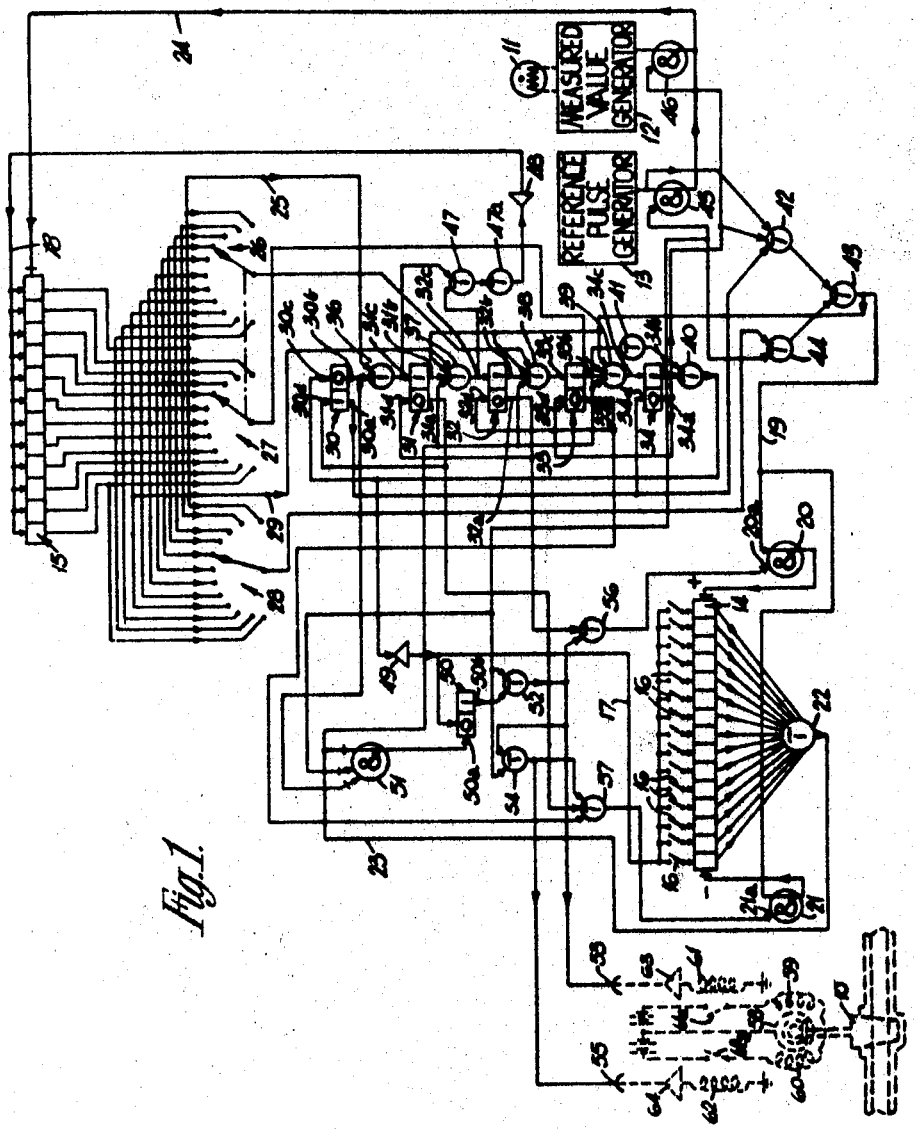

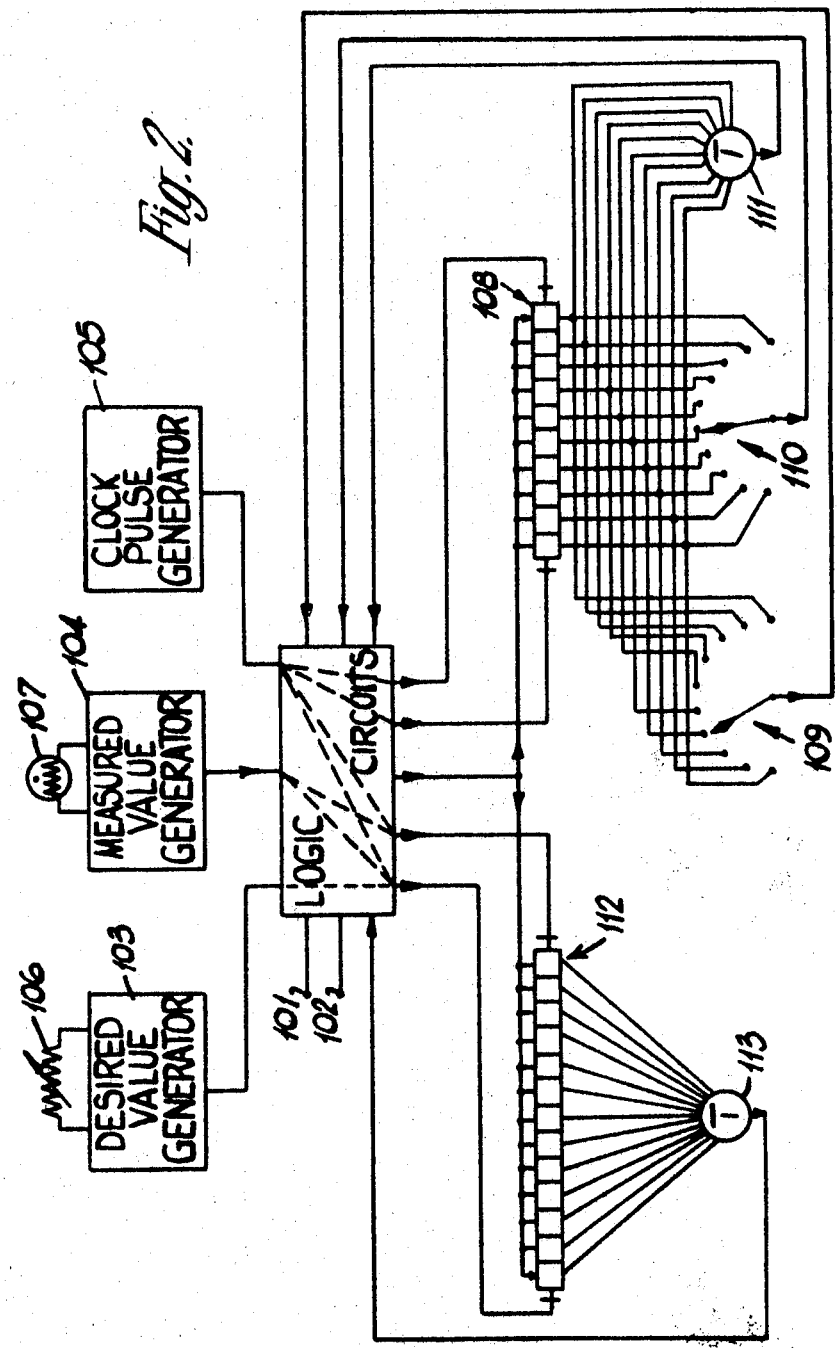

United States Patent Office 3,445,638
Patented May 20, 1969

3,445,638
PROCESS CONTROL APPARATUS IN WHICH A MEASURED VALUE IS CONTROLLED IN COMPARISON WITH A DESIRED VALUE
George A. Montgomerie, Leamington, England, assignor to Serck R. & D. Limited, Birmingham, England
Filed Mar. 12, 1965, Ser. No. 439,316
Claims priority, application Great Britain, Mar. 16, 1964, 10,973/64
Int. Cl. G06f 5/06
U.S. Cl. 235—151.1                   9 Claims This invention relates to process control apparatus of the kind in which the value of a parameter is measured and is compared with the desired value of the parameter and a control element is adjusted to cause the parameter to approach its desired value. It is an object of the invention to provide control apparatus of this kind in a convenient form.

Control apparatus according to the invention comprises a first counting device, means for producing in said counting device a count state corresponding to the desired value of the parameter, first means, including an element sensitive to the value of the parameter, for producing a pulsating signal the mean frequency of which is dependent on the value of the parameter, means arranged to vary the count state of the counting device by a number dependent on said frequency, and means sensitive to the final count state of the counting device to adjust the control element.

Reference will now be made to the accompanying drawings in which FIGURE 1 is a logic circuit diagram showing one example of process control apparatus in accordance with the invention and FIGURE 2 is a block diagram illustrating another embodiment of the invention.

Referring firstly to FIGURE 1 it is desired to adjust the setting of a fluid control valve 10 in accordance with the temperature of a temperature sensitive element 11. The element 11 forms a part of a measured value pulse generator 12 which, in use, produces pulses at a frequency determined by the value of the element 11 which in turn is dependent of the value of the temperature being controlled. The circuit also includes a reference pulse generator 13.

There are also provided two electronic counters of the known type comprising a plurality of interconnected bistable circuits arranged to count in a binary sequence. Each of these bistable circuits has an output terminal from which a signal is produced when the circuit is in one state, but from which no signal is produced when the circuit is in its other state. For the sake of simplicity the state when a signal is produced will be referred to hereinafter as the ON state and the state in which no signal is produced as the OFF state.

Counter 14 is what will be referred to hereinafter as the signal counter. The count state of this counter at the end of each counting sequence is employed, as will be described, to influence the setting of valve 10. The timing counter 15, on the other hand is principally used for controlling the timing of necessary sequence of counting operations. The initial setting of signal counter 14 is determined by a bank of switches 16. These switches 16 direct a signal received in line 17 into selected ones of the bistable circuits of counter 14. As will be described later a pulse is received in line 17 at a time when the count state of counter 14 is zero (i.e., when all the bistable circuits are in off states) and the selected circuits are then driven into ON states by this pulse. Thus the switches 16 and the circuits (not yet described) whereby a pulse is produced and gated to line 17 form in combination means whereby a desired number can be set in the counter 14. Means are also provided whereby the timing counter 15 can be reset. In this case all the bistable circuits are reset by a pulse from a line 18 to their ON states.

The signal counter 14 is reversible, that is to say pulses supplied to it by line 19 either add to the existing count state or subtract from it. For this purpose the line 19 is connected to different parts of the counter through two AND gates 20, 21. Each of these gates has a second input terminal 20a, 21a and pulses are only admitted to the counter through either of the gates when the second input terminal of that gate is not receiving a signal from elsewhere. Pulses passed by gate 20 add to the existing count state, whereas pulses passed by gate 21 subtract from the count state.

The output terminals of counter 14 are all connected to a NOR gate 22, the output of which is shown as line 23. Thus a signal is present in line 23 only when all the bistable circuits of counter 14 are in their off states.

Counter 15 is arranged so that pulses received from line 24 always add to the existing count state. Thus, after the counter has been reset by a signal in line 18, a first pulse will cause the signal at the output terminal of the first bistable circuit to disappear, a second pulse will cause this signal to reappear accompanied by the disappearance of the signal at the output terminal of the second bistable circuit and so on in a normally binary counting sequence. For convenience the counter 15 shown has twelve bistable circuits and the output terminals of these will be referred to as first, second . . . and twelfth output terminals.

The first output terminal of the timing counter 15 is connected to a terminal 25. The first to the eleventh terminals are connected respectively to the eleven terminals of a first selector switch 26. The second to twelfth terminals are connected to a second selector switch 27 ganged with the first selector switch 26 so that when nth output terminal has been selected by switch 26, the (n+1)th output terminal is selected by switch 27. A third selector switch 28 has twelve terminals connected respectively to the twelve output terminals of the counter 15. A further tapping 29 is taken from one of the output terminals in the case shown from the ninth output terminal.

The switches 26 and 27 and the terminals 25, 29 are connected to the first four stages of a sequencing ring counter. This counter comprises bistable circuits 30, 31, 32, 33, and 34, and NOR gates 36, 37, 38, 39 and 40. As shown each bistable circuit has two output terminals and when the circuit is in one state there is a signal produced at one terminal but not at the other and when the circuit is in its other state, the signal is at said other terminal. In the drawing the circuit is shown in a condition in which circuit 30 is in what will be referred to as an on state whilst the remainder are in off states. Thus the first output terminal 30a of circuit 30 is producing an output and second output terminal 30b thereof is producing no output. The circuit 30 has previously been driven to this on state by a pulse received at first input terminal 30c and can only be driven to its off state by a pulse received at second input terminal 30d.

It will be seen that the terminal 30b is connected to one input terminal of gate 36 another input terminal of which is connected to terminal 25 It will be realised, of course, that gate 36 will produce an output only when neither of its inputs receives a signal. The output terminal of gate 36 is connected to the first input terminal 31c of circuit 31 and the first output terminal 31a is connected to the terminal 30d of circuit 30. Thus with circuits 30, 31 in the states shown removal of both input signal to gate 36 will result in terminal 31c receiving a pulse and causing a signal to be produced at terminal 31a. This signal is fed to circuit 30 which changes state and produces a signal at terminal 30b to switch off gate 36.

In a similar manner the second output terminal 31b of circuit 31 is connected to one input terminal of gate 37 the output of which is supplied to first input terminal 32c of circuit 32. The first output terminal 32a of circuit 32 is connected to the second input terminal 31d of circuit 31. Second output terminal 32b of circuit 32 is connected to one input of gate 38 the output of which is connected to first input terminal 33c of circuit 33. First output terminal 33a of circuit 33 is connected to second input terminal 32d of circuit 32. Second output terminal 33b of circuit 33 is connected to one input terminal of gate 39 the output of which is connected to first input terminal 34c of circuit 34. First output terminal 34a of circuit 34 is connected to second input terminal 33d of circuit 33. Second output terminal 34b of circuit 34 is connected to one input terminal of gate 40 and the output of this gate is connected back to terminal 30d. To complete the ring terminal 30a is connected to second input terminal 34d of circuit 34. It will be seen that at all times one and only one of the circuits 30, 31, 32, 33, 34 is in the on state, the remainder being in the off state. The gates controlling the ring counter are connected as follows:

Gate 37 has inputs connected via line 23 to the output of gate 22, to terminal 29 and to line 19. Gate 38 has inputs connected to line 23 to the output terminal of selector 26 and to line 19. Gate 39 has inputs connected to line 23, to the output terminal of selector switch 27 and to line 19. Finally, gate 40 has an input connected to the input of a NOR gate 41 with its one input terminal connected to line 23.

The signal counter 14 receives its pulses from reference pulse generator 13 under the control of NOR gates 42 and 43. Gate 42 has inputs from terminal 30a, from terminal 34a and from generator 13. Gate 43 is controlled by NOR gate 44 having inputs from terminal 34b and from the output terminal of switch 29.

At different times during the cycle of operation the timing counter 15 receives pulses from the reference pulse generator 13 and the measured value generator 12 via line 24 under the control of AND gates 45, 46. The outputs of these gates are both connected to line 24, gate 45 having an input connected to terminal 34b and gate 46 having an input connected to terminal 34a.

The aforementioned signal for resetting timing counter 15 via line 18 is produced under the control of a NOR gate 47 with its output connected via a NOR gate 47a and an amplifier 48 to line 18. Gate 47 has two inputs from the outputs of the gates 36 and 37 respectively.

The setting of counter 14 is effected by a signal initiated by gate 22 and amplified by amplifier 49. Amplifier 49 also supplies a setting pulse to a bistable circuit 50 having an input terminal 50a such that successive pulses to terminal 50a change state of circuit 50. In the state shown (i.e., the off state) an output is produced at terminal 50b and in the other state no such output is produced.

Terminal 50a is connected to the output terminal of an AND gate 51 having three input terminals connected respectively to line 23, to terminal 34b and to terminal 30b. Terminal 50b is connected to one input of a NOR gate 52, the other input of which is connected to terminal 34b and the output of which is connected to a first output terminal 53. The output of gate 52 is also connected to an input of a NOR gate 54 also having an input connected to terminal 34b and having an output connected to second output terminal 55.

As stated above and AND gates 20 and 21 control whether pulses received by counter 14 algebraically increase or decrease the count state existing therein. Terminal 20a of gate 20 is connected to the output of a NOR gate 56 having two inputs connected respectively to the output of gate 52 and to terminal 32a. Terminal 21a of gate 21 is connected to the output of a NOR gate 57 having three inputs connected respectively to terminal 33a, to the output of gate 54 and to terminal 31a.

Control of valve 10 is effected by a reversible motor 58 drivingly connected to the movable part of valve 10. The windings 59, 60 of this motor receive power respectively via contacts 61a, 62a of relays 61, 62. Amplifiers 63, 64 energise relays 61, 62, respectively, when signals are being received from terminals 53, 55, respectively.

For the sake of convenience the operation of the circuit will be described starting at a stage prior to the stage in which the circuit is illustrated. During this stage the count state in counter 14 is approaching zero (as will hereinafter be explained) and bistable circuit 34 is in the on state, circuits 30–33 being in the off state. It will be seen that, as counter 14 reaches zero count, a pulse will be passed from gate 22 via line 23 to gate 41. The output from gate 41 will thus be removed and gate 40 will thus be operated (it being understood that there is no output at this time from terminal 34b). The pulse from gate 40 will have three effects. Firstly it will be amplified by amplifier 49 and direct pulses through switches 16 to selected ones of the circuits of counter 14. A number corresponding to the desired value of the temperature is thus set in counter 14. Secondly circuit 50 is reset.

Thirdly the pulse from gate 40 also passes to terminal 30d. The ring counter is therefore changed into the state shown. It will be seen then that since there is now an output from terminal 34b there can be no output from gate 44. Similarly the output from terminal 30a prevents pulses passing from gate 42. Thus gate 43 produces a continuous signal as long as the circuit stays in this condition and the count state of counter 14 is not changed. It will also be seen, however, that gate 45 is opened because there is no output from terminal 34b, whilst gate 46 is closed because there is an output from terminal 34a. Thus a pulse can be passed from generator 12 to counter 15. This pulse causes the existing signal at terminal 25 to be removed and there are thus no signals entering gate 36, which therefore produces a signal to switch circuit 31 on.

The immediate effect of this is to switch circuit 30 off so that the signal applied by gate 36 is stopped. During the time when gate 36 was producing a signal, gate 47 was switched off and thus signal from gate 47a was applied via line 18 to set the counter 15 to a zero count state. Pulses continue to pass from generator 12 to counter 15 and the count steadily accumulates therein at a rate dependent on the frequency of generator 12 and thus on the temperature sensed by element 11. Meanwhile pulses are fed into counter 14 from generator 13 at a constant rate via gate 42 (which passes pulses since there are no signals from terminals 30a and 34a), gate 43 (which passes pulses since gate 44 is prevented from producing a signal by the signal from terminal 34b) and gate 21 which passes pulses since gate 57 is producing no output (gate 52 being held off by the signal from terminal 34b and circuit 32 being in its off state). Gate 20, on the other hand, is held off because gate 56 is producing a signal. Thus the pulses received from generator 13 are subtracted from the preset count state.

This state of affairs continues until the signal at terminal 29 is removed. This occurs after a period varying approximately inversely with the mean frequency of the generator 12 during the period. Thus the number subtracted from the original count state in the counter 14 is approximately inversely proportional to the mean frequency of the generator 12 during the period. The count state of the counter 14 at this stage is therefore dependent on the frequency of the generator 12, during the preceding period. It should here be noted that if the frequency of generator 12 is lower than the frequency when the parameter is at its desired value, the count state at this stage will be negative.

The removal of the signal from terminal 29 causes the gate 37 to produce a signal as soon as signals are next absent from lines 19 and 23 (as will be explained hereinafter). This causes circuit 32 to be switched on, thus switching off circuit 31. The short pulse produced by gate 37 is utilised to reset counter 15 to zero and pulses continue to be counted into it from generator 13. The changes of circuits 31 and 32 also cause the signal from gate 56 to be stopped and for a signal to be produced from gate 57. Thus gate 21 is closed and gate 20 is opened.

The count state of counter 14 is thus increased again by pulses from generator 13. This continues until the terminal selected on switch 26 ceases to produce a signal. Thus the length of this second period is determined once again by the mean frequency of generator 12 during the period and the state of counter 14 is increased by a number which is approximately inversely proportional to the mean frequency of generator 12 during the second period.

After the signal from switch 26 disappears gate 38 produces a signal as soon as there are no signals from lines 23 and 19. Circuit 33 is switched on and circuit 32 is switched off, but counter 15 is not reset so that its count state continues to increase at a rate determined by the frequency of generator 12. The signal from gate 57 disappears and a signal is produced by gate 56. Thus gate 21 is switched on, gate 20 being switched off, and the count state of counter 14 is again reduced by pulses from generator 13.

This continues until the count state of counter 15 is double what it was when gate 33 was actuated, because switch 27 always selects a terminal one higher in the binary scale than that selected by switch 26. During the time taken between the operation of switches 26 and 27 the count state of counter 14 is reduced by a number approximately proportional to the inverse of the mean frequency of the generator 12 during this third period. If the frequency of generator 12 is increasing, therefore, the net effect of the second and third periods will be to increase the count state of the counter 14. If, on the other hand the frequency is decreasing the count state of counter 14 will be reduced.

The final residue in counter 14 is thus the sum of two terms. One of these terms may be considered to vary with the deviation of the measured frequency of generator 14 from the desired frequency. When the two frequencies are equal then this term will be zero. If the measured frequency is too low the term will be negative, and if the measured frequency is too high the term will be positive. The other term may be considered to be a measure of the rate of change of the frequency of generator 14 during the second and third periods. If the frequency is tending to increase then this second term will tend to be positive. If, on the other hand, the frequency is tending to decrease then this term will be negative. Thus the actual residue when, for example, the frequency is low and increasing will be less negative than when it is low and decreasing. Similarly the residue is less positive when the frequency is high and decreasing than it is when the frequency is high and increasing.

The removal of the signal from the output of switch 27 causes gate 39 to produce a signal when no signals are received from lines 19 and 23. This signal from gate 39 switches on circuit 34 which switches off circuit 33. This causes several changes. Firstly, the apperance of the signal at terminal 34a causes gate 46 to be closed and no further pulses are fed to counter 15 by generator 12. The disappearance of the signal at terminal 34b however, opens gate 45 and pulses from generator 13 are now fed to counter 15. Gate 42 is held off by the signal from terminal 34a, whilst gate 44 is now so arranged that in the absence of a signal from switch 28 a signal is produced which causes a signal from gate 43 to be removed. Switch 28 and counter 15 form, in combination a frequency dividing circuit which produces pulses at (in the adjustment shown) one thirty-secondth of the frequency of generator 13. These pulses are fed to counter 14 to cause its count state to be returned to zero.

It will be realized that if, whilst circuit 31 is in its on state, the count state of counter 14 passes through zero then a signal will be produced by gate 22 and passed by gate 51 to change the state of circuit 50. If in the next stage (whilst circuit 32 is on) the count state passes through zero again then circuit 50 will be changed back to its original state. A further change may occur whilst circuit 33 is in its on state. Thus if no changes or two changes have occurred the count state of counter 14 will be positive. If one or three changes have occurred then the count state will be negative.

In the former case during the final stage (with circuit 34 in its on state) there will be an input from terminal 50b into gate 52. This gate will thus produce no signal and gate 57 will produce no signal. Thus gate 21 will be opened to enable the pulses from switch 28 to subtract from count state of counter 14. At the same time there will be no signals at the inputs of gate 54 and a continuous signal will therefore appear at terminal 55. Thus motor 60 will be driven in one direction to open or close valve 10 as the case may be. Where valve 10 controls steam flow through a heater and the frequency of generator 12 decrease with increase of temperature, then valve 10 will be opened under these circumstances.

In the latter case gate 52 will produce a signal and the pulses from switch 28 will be admitted to counter 14 via gate 20 and will increase the count state towards zero. Furthermore a continuous output will be produced at terminal 53 and the motor 58 will be driven in the opposite direction to close the valve 10.

Adjustment of the valve in the desired direction continue until counter 14 registers zero at which time the cycle described restarts.

The sensitivity of the controller is adjusted by means of switch 28 which governs the time taken to remove the residual count state. Switches 26, 27 on the other hand control the stability of the device by varying the relative magnitude of the second term in the residual count state.

As is mentioned above there is a possibility that the count state of counter 14 will pass through zero whilst anyone of circuits 31, 32 and 33 is in its on state. If the direction of counting is changed as the conuter is changing from its zero state there is a danger that the change over will be interrupted in some intermediate state. Connection of line 23 to gates 37, 38 and 39 prevents this from happening, since if gate 22 is producing an output at the time when any one of these gates is about to be actuated, actuation will be delayed until the output from gate 22 ceases. This also ensures that if such a changeover as is described above occurs the circuit 50 will have its state changed twice, whereas only one changeover of circuit 50 might occur if the conuter 14 were reversible whilst in its zero count state.

Similarly it is desirable to ensure that reversal of counter 14 is prevented whilst a pulse is being received by counter 14. This is taken into account by the connection of line 19 to gates 37, 38 and 39.

The example shown diagrammatically in FIGURE 2 has output terminals 101, 102 corresponding respectively to terminals 53, 55. In this case a desired value pulse generator 103, is employed in addition to a measured value pulse generator 104 and a reference pulse generator 105. Generator 103 includes an adjustable element 106 by means of which the frequency of its signal can be varied. The generator 104 has a variable element 107 sensitive to the parameter to be measured, e.g., temperature or pressure. Variation of this element causes variation of the frequency of generator 104.

A timing counter 108 is included in the circuit, this counter being reversible like conuter 14. The output terminals of counter 108 are connected, as shown, to first and second switches 109, 110 and to a NOR gate 111. A signal counter 112 is also reversible and has its output terminals connected to a NOR gate 113.

The various generators, counters, switches and gates are interconnected by logic circuits 114 such that the apparatus operates in the following cycle:

At the beginning of the cycle a pulse resets both counters 108 and 112 to zero count states. Pulses are then admitted to counter 108 from generator 105 and cause the count state of this counter to be increased. At the same time pulses from generator 104 are admitted to counter 112 and cause the count state of this counter to be increased at a rate determined by value of element 107. This continues until the count state indicated on switch 109 is reached. This occurs after a time interval directly proportional to the setting of switch 109 and the number of pulses received by counter 112 therefore equal to the product of the mean value of the frequency over this period and the length of the interval.

The operation of switch 109 causes pulses from generator 103 to be supplied to counter 112 instead of pulses from generator 104. This continues for an interval determined by the difference between the setting of switches 109 and 110 and at the end of the interval the count state of counter 112 has been increased by a number equal to the product of the set frequency of generator 103 and the length of this second interval.

On operation of switch 110 pulses are fed to counter 112 from generator 104 to subtract from the existing count state and pulses from generator 105 are substracted from the count state of counter 108. This continues until the state of counter 108 is again zero which takes a time equal to sum of the two preceding intervals and a number equal to the product of the mean frequency of generator 104 during the period and the length of the period is subtracted from the count of counter 112. The residual count state of the counter 112 is thus $$\bar{f}_1 T_1 + f' T_2 - \bar{f}_2(T_1 + T_2)$$

where $\bar{f}_1$ and $\bar{f}_2$ are the mean frequencies of generator 104 during the first and final periods, $T_1$ is the length of the first period and $T_2$ the length of the second period, $f^1$ being the frequency of generator 103. This expression will be seen to be the sum of two terms namely $T_2(f^1 - \bar{f}_2)$ and $T_1(\bar{f}_1 - \bar{f}_2)$. The first of these terms is dependent on the difference between the frequencies of the generators 103 and 104 and the second term is a measure of the rate of change of the frequency of generator 104.

In the final stage an output is fed from either terminal 101 or terminal 102 (the choice depending on whether the residual count state of counter 112 is positive or negative).

Meanwhile pulses are fed from generator 105 into counter are reversed to produce the complement of the state is regained the cycle starts again and it will be realized that the length of time during which the output is produced at terminal 101 or 102 is determined by the magnitude of the residual count state.

The sensitivity and stability of the controller can be varied by adjusting switches 110 and 109, respectively.

Many variations can be employed in the principle forming the subject of the invention. For example, in the example described in FIGURE 1 counter 14 is reversible. This may be replaced, however, by an irreversible counter in combination with a circuit for complementing the count state at the end of each stage. Thus the first action will be to set the counter with the complement of the desired value state. Pulses are then added as before and at the end of the first stage all the bistable circuits of the counter are reversed to produce the complement of the residue. The counter continues to receive pulses and complementing occurs again at the end of the second stage and at the end of the third stage. The final residual count state is the same as it would have been had the apparatus as shown in FIGURE 1 been employed.

Further alternatives include the use of electromechanical, hydraulic or pneumatic devices to make up the counters and sequencing arrangements.

Although the arrangements described above provide a control based on both the difference between the parameter and its desired value and the rate of change of the parameter, the invention also includes apparatus which is responsive only to the difference. Referring to FIGURE 2 omission of switch 109 produces such apparatus which can, of course, only be used to control processes with a transfer function such as to inhibit gross overcorrection.

The same apparatus may, if desired and with certain modifications, be employed to control a plurality of different control elements in accordance with a plurality of different measured value generators. This may conveniently be effected by including in the apparatus a further ring counter arranged so that the measured value generators feed the apparatus in successive cycles of counter 14 and the counter controls the control elements in the same cycle. For each measured value operator it may be required to set the counter to a different initial value. This may be achieved by employing stores which are all set (by using, for example, switches 16) when the apparatus is initially programmed.

It will also be desired in some circumstances to control the position of a control element in accordance with some function of two or more parameters. Separated measured value generators are used and the ring counter is extended to enable these generators to feed pulses into the apparatus in different periods of each cycle of the counter. Alternatively it may be possible to replace the reference generator by a variable frequency generator the frequency of which is determined by a parameter different from the parameter sensed by the measured value generator.

For some processes it may be found that stability will be improved if further terms are added to the residual count state of the signal counter by additional stages in the ring counter and additional selector switches. These terms may be considered as representing second and higher time derivations of the parameter.

Having thus described my invention what I claim as new and desire to secure by Letters Patent is:

1. Process control apparatus having a control element for a process having a variable parameter responsive to control of the process comprising a first counting device, means for producing in said counting device a count state corresponding to the desired value of the parameter, first means, including an element sensitive to the value of the parameter, for producing a pulsating signal the mean frequency of which is dependent on the value of the parameter, means arranged to vary the count state of the counting device by a number dependent on said frequency, and means sensitive to the final count state of the counting device to adjust the control element.

2. Apparatus as claimed in claim 1 incorporating a second means for producing a pulsating signal, at a constant frequency, and means whereby this signal is admitted to the first counting device to cause the count state thereof to approach a predetermined value, the time taken to change from said final value to said predetermined value being a measure of the deviation of the parameter from its desired value.

3. Apparatus as claimed in claim 2 including a second counting device operable to control the sequence of operation of the apparatus.

4. Apparatus as claimed in claim 3 in which said second counting device incorporates a plurality of binary units each of which produces a signal at a frequency which is a fraction of the frequency of the signal it receives, the arrangement being such that, during the change from the final value to the predetermined value the pulses fed into the first counting device are obtained from a selected one of the binary units of the second counting device whilst the second counting device receives a constant frequency pulsating signal from the second pulse producing means.

5. Apparatus as claimed in claim 4 wherein variation of the count state of the first counter to produce said final value is obtained by feeding pulses from the second pulse-producing means into the first counting device whilst pulses from the first pulse-producing means are fed into the second counting device, means being provided to cease supply of pulses to the first counting device when the second counting device attains a predetermined count state.

6. Apparatus as claimed in claim 5 in which said first counting device is reversible, means being provided for reversing the first counting device when the final value is attained if the number of pulses admitted exceeds the count state initially produced in the first counting device.

7. Apparatus as claimed in claim 6 wherein there is provided means sensitive to the count state of the second counting device arranged to cause the count state of first counter to be first decreased to produce a count state dependent on the deviation of the parameter from its desired value, and then to be increased and decreased for successive periods to modify the count state of the first counter by a number determined by the rate of change of the variable, so that, in use, the amount of adjustment of the control element is determined by the deviation and by the rate of change.

8. Apparatus as claimed in claim 7 in which the length of said successive periods can be adjusted by means of selector devices cooperating with the binary units of the second counting device.

9. Apparatus as claimed in claim 2 in which said first counting device comprises a plurality of interacting binary units and said means for producing in the counting device a count state corresponding to the desired value of the parameter, comprises selector means whereby the individual binary units can be set.

References Cited

UNITED STATES PATENTS

| 2,928,033 | 3/1960 | Abbott. |
| 3,086,708 | 4/1963 | Berkowitz et al. __ 235—151.1 X |
| 3,088,315 | 5/1963 | Withers _____ 235—151.34 X |
| 3,229,077 | 1/1966 | Gross _____ 235—151.1 X |

MALCOLM A. MORRISON, *Primary Examiner.*

JOSEPH F. RUGGIERO, *Assistant Examiner.*

U.S. Cl. X.R.

235—92